US012711895B2

(12) United States Patent
Lim et al.

(10) Patent No.: US 12,711,895 B2
(45) Date of Patent: Aug. 18, 2026

(54) DISPLAY DRIVER AND DISPLAY DEVICE INCLUDING THE SAME

(71) Applicant: LX Semicon Co., Ltd., Daejeon (KR)

(72) Inventors: Kyung Hyun Lim, Daejeon (KR); Sun Wha Koh, Daejeon (KR); Jun Young Lee, Daejeon (KR); Woo Seok Seong, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 3 days.

(21) Appl. No.: 19/058,207

(22) Filed: Feb. 20, 2025

(65) Prior Publication Data

US 2025/0265964 A1 Aug. 21, 2025

(30) Foreign Application Priority Data

Feb. 21, 2024 (KR) ........................ 10-2024-0025100
Jan. 16, 2025 (KR) ........................ 10-2025-0006758

(51) Int. Cl.
*G09G 3/20* (2006.01)
*G09G 3/3225* (2016.01)
*G09G 3/36* (2006.01)

(52) U.S. Cl.
CPC ......... *G09G 3/2092* (2013.01); *G09G 3/3225* (2013.01); *G09G 3/3648* (2013.01); *G09G 2300/0408* (2013.01); *G09G 2300/0465* (2013.01); *G09G 2310/0275* (2013.01); *G09G 2310/08* (2013.01); *G09G 2330/021* (2013.01); *G09G 2360/12* (2013.01)

(58) Field of Classification Search
CPC .. G09G 3/2092; G09G 3/3225; G09G 3/3648; G09G 2300/0408; G09G 2300/0465; G09G 2310/0275; G09G 2310/08; G09G 2330/021; G09G 2360/12
See application file for complete search history.

(56) References Cited

U.S. PATENT DOCUMENTS

| | | | | |
|---|---|---|---|---|
| 2006/0044249 | A1* | 3/2006 | Lee | G09G 3/3611 345/98 |
| 2017/0212540 | A1* | 7/2017 | Cho | H03K 5/1534 |
| 2018/0188795 | A1* | 7/2018 | Yang | G09G 3/2096 |

FOREIGN PATENT DOCUMENTS

| | | | |
|---|---|---|---|
| KR | 10-2016-0057028 | A | 5/2016 |
| KR | 10-2023-0146426 | A | 10/2023 |

* cited by examiner

*Primary Examiner* — Adam J Snyder

(74) *Attorney, Agent, or Firm* — Birch, Stewart, Kolasch & Birch, LLP

(57) ABSTRACT

A display driver and a display device including the same are disclosed. The display driver includes a voltage adjustment part that receives a driving voltage from a power supply and outputs a first voltage and a second voltage; a frame memory that receives the first voltage and stores pixel data of input images; a digital circuit part that is driven by receiving the second voltage and includes a memory, a plurality of functional blocks, and a power controller; and a control part that generates a control signal for controlling the driving voltage in response to a signal input from the digital circuit part.

20 Claims, 5 Drawing Sheets

DISPLAY DRIVER AND DISPLAY DEVICE INCLUDING THE SAME

CROSS-REFERENCE TO RELATED APPLICATION

This application claims priority to and the benefit of Korean Patent Application No. 10-2024-0025100, filed in the Republic of Korea on Feb. 21, 2024 and Korean Patent Application No. 10-2025-0006758, filed in the Republic of Korea on Jan. 16, 2025, the entire disclosures of all these applications being hereby expressly incorporated by reference into the present application.

BACKGROUND

Field

The embodiments of the present disclosure relate to a display driver and a display device including the same.

Description of Related Art

Display devices such as liquid crystal displays (LCD) and organic light emitting diode displays (OLED display) include driving circuits for writing pixel data of input images to pixels of display panels. As one example of such driving circuits, a display driver integrated circuit (IC) (hereinafter referred to as 'DDI') is known.

Research is actively being conducted to optimize power consumption of display devices. When the power consumption of display devices is optimized, battery usage time can be extended in portable devices to prolong battery life, reduce heat generation, and implement eco-friendly devices that contribute to a sustainable environment.

SUMMARY OF THE DISCLOSURE

The present disclosure aims to solve the aforementioned needs and/or problems.

The present disclosure provides a low-power display driver that may optimize power consumption and a display device including the same.

The objectives of the present disclosure are not limited to those mentioned above, and other objectives not mentioned may be clearly understood by those skilled in the art from the following descriptions.

A display driver according to one exemplary embodiment of the present disclosure, includes: a voltage adjustment part configured to receive a driving voltage from a power supply and to output a first voltage and a second voltage; a frame memory configured to receive the first voltage and to store pixel data of input images; a digital circuit part configured to be driven by receiving the second voltage, the digital circuit part including a memory, a plurality of functional blocks, and a power controller; and a control part configured to generate a control signal for controlling the driving voltage in response to a signal input from the digital circuit part.

The control part may include an MCU (Micro Control Unit).

The voltage adjustment part may include an LDO (Low Dropout Regulator).

The first voltage and the second voltage may be lower than the driving voltage. The second voltage may be lower than the first voltage.

The control part may be configured to generate the control signal in response to one or more of: an enable signal of each of the functional blocks, frame frequency or refresh rate of the input images, DBV (Display Brightness Value), and on pixel ratio (OPR).

The power controller may be configured to transmit the control signal to the power supply through SWIRE (Single Wire Interface). The power supply may be configured to change a voltage level of the driving voltage after a predetermined delay time in response to the control signal.

The driving voltage may decrease after a first delay time when the frame frequency or refresh rate of the input images decreases, and increase after a second delay time when the frame frequency or refresh rate of the input images increases.

While monitoring each enable signal of functional blocks in real-time, the driving voltage may decrease when a number of the functional blocks in operation decreases and increase when the number of functional blocks in operation increases.

When the frame frequency of the input images decreases from a first frequency to a second frequency, the driving voltage decreases to a first voltage level after a first delay time, While the frame frequency of the input images is maintained at the second frequency, when a voltage of a first enable signal is inverted from an activation level to a deactivation level, the driving voltage decreases from the first voltage level to a second voltage level after a second delay time, While the frame frequency of the input images is maintained at the second frequency and the voltage of the first enable signal is maintained at the deactivation level, when a voltage of a second enable signal is inverted from the activation level to the deactivation level, the driving voltage decreases from the second voltage level to a third voltage level after a third delay time, and While the frame frequency of the input images is maintained at the second frequency and the voltages of both the first enable signal and the second enable signal are maintained at the deactivation level, when the frame frequency of the input images increases from the second frequency to the first frequency, the driving voltage increases from the third voltage level to a fourth voltage level after a fourth delay time.

The voltage level of the driving voltage may decrease when the DBV decreases, and the voltage level of the driving voltage may increase when the DBV increases.

The voltage level of the driving voltage may decrease when the on pixel ratio decreases, and the voltage level of the driving voltage may increase when the on pixel ratio increases.

When either one of the DBV and the on pixel ratio decreases, the voltage level of the driving voltage may decrease to a first voltage level, and when both the DBV and the on pixel ratio decrease, the voltage level of the driving voltage may decrease to a second voltage level that is lower than the first voltage level.

When the frame frequency of the input images decreases, the vertical blank period may be extended. When entering the extended vertical blank period, the voltage level of the driving voltage may decrease. Before entering the active interval from the extended vertical blank period, the voltage level of the driving voltage may increase.

A display device according to one exemplary embodiment of the present disclosure, includes: a display panel including a plurality of data lines, a plurality of gate lines intersecting with the data lines, and a plurality of pixels arranged for displaying input images; a data driver configured to convert received pixel data into data voltages and to supply the data voltages to the data lines; a timing controller configured to receive pixel data and timing signals of the input images and transmits the pixel data to the data driver; and a power supply configured to output a driving voltage. The timing controller includes: a voltage adjustment part configured to receive the driving voltage and to output a first voltage and a second voltage; a frame memory configured to receive the first voltage and stores pixel data of the input images; a digital circuit part configured to be driven by receiving the second voltage, the digital circuit part including a memory, a plurality of functional blocks, and a power controller; and a control part configured to generate a control signal for controlling the driving voltage in response to a signal input from the digital circuit part.

A display device according to another exemplary embodiment of the present disclosure, includes: a display panel including a plurality of data lines, a plurality of gate lines intersecting with the data lines, and a plurality of pixels arranged for displaying input images; a display driver IC (Integrated Circuit) configured to receive pixel data and timing signals of the input images and to convert the pixel data into data voltages to supply the data voltages to the data lines; and a PMIC (Power Management Integrated Circuit) configured to output a driving voltage. The display driver IC includes: an LDO (Low Dropout Regulator) configured to receive the driving voltage and to output a first voltage and a second voltage; a frame memory configured to receive the first voltage and to store pixel data of the input images; a digital circuit part is configured to be driven by receiving the second voltage, the digital circuit part including a memory, a plurality of functional blocks, and an MCU (Micro Control Unit) configured to generate a control signal for controlling the driving voltage in response to a signal input from the digital circuit part.

The embodiments of the present disclosure may reduce power consumption without degrading display quality and performance of the display device by incorporating a control part, for example, a Micro Control Unit (MCU), having control authority over the power supply within the DDI or timing controller, and optimizing the driving voltage based on the operating state of the digital circuit part and analysis results of input images.

The embodiments of the present disclosure enable control of internal operations of the DDI or timing controller through firmware in the MCU embedded in the DDI or timing controller, and updates are easily facilitated.

The effects of the present disclosure are not limited to those mentioned above, and other effects not mentioned may be clearly understood by those skilled in the art from the description of the claims.

BRIEF DESCRIPTION OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION OF THE EMBODIMENTS

Figure 1:
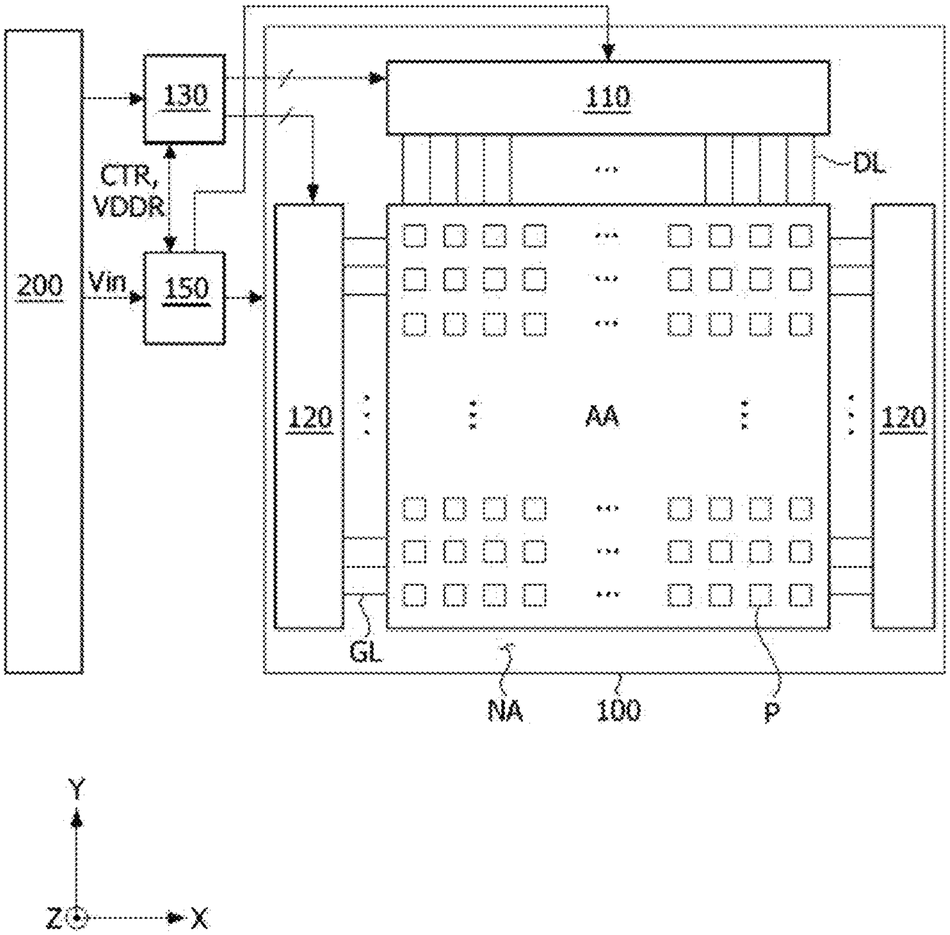
FIG. 1 is a block diagram showing a display device according to an embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as “comprising,” “including,” “having,” and “containing” used herein are generally intended to allow other components to be added unless the terms are used with the term “only.” Any references to singular may include plural unless expressly stated otherwise.

Components are interpreted to include an ordinary error range even if not expressly stated.

When a positional or interconnected relationship is described between two components, such as “on top of,” “above,” “below,” “next to,” “connect or couple with,” “crossing,” “intersecting,” or the like, one or more other components may be interposed between them, unless “immediately” or “directly” is used.

When a temporal antecedent relationship is described, such as “after”, “following”, “next to”, “before”, or the like, it may not be continuous on a time base unless “immediately” or “directly” is used.

The terms “first,” “second,” and the like may be used to distinguish elements from each other, but the functions or structures of the components are not limited by ordinal numbers or component names in front of the components.

The following embodiments can be partially or entirely bonded to or combined with each other and can be linked and operated in technically various ways. The embodiments can be carried out independently of or in association with each other.

Hereinafter, various embodiments of the present disclosure will be described in detail with reference to the accompanying drawings.

Figure 2:
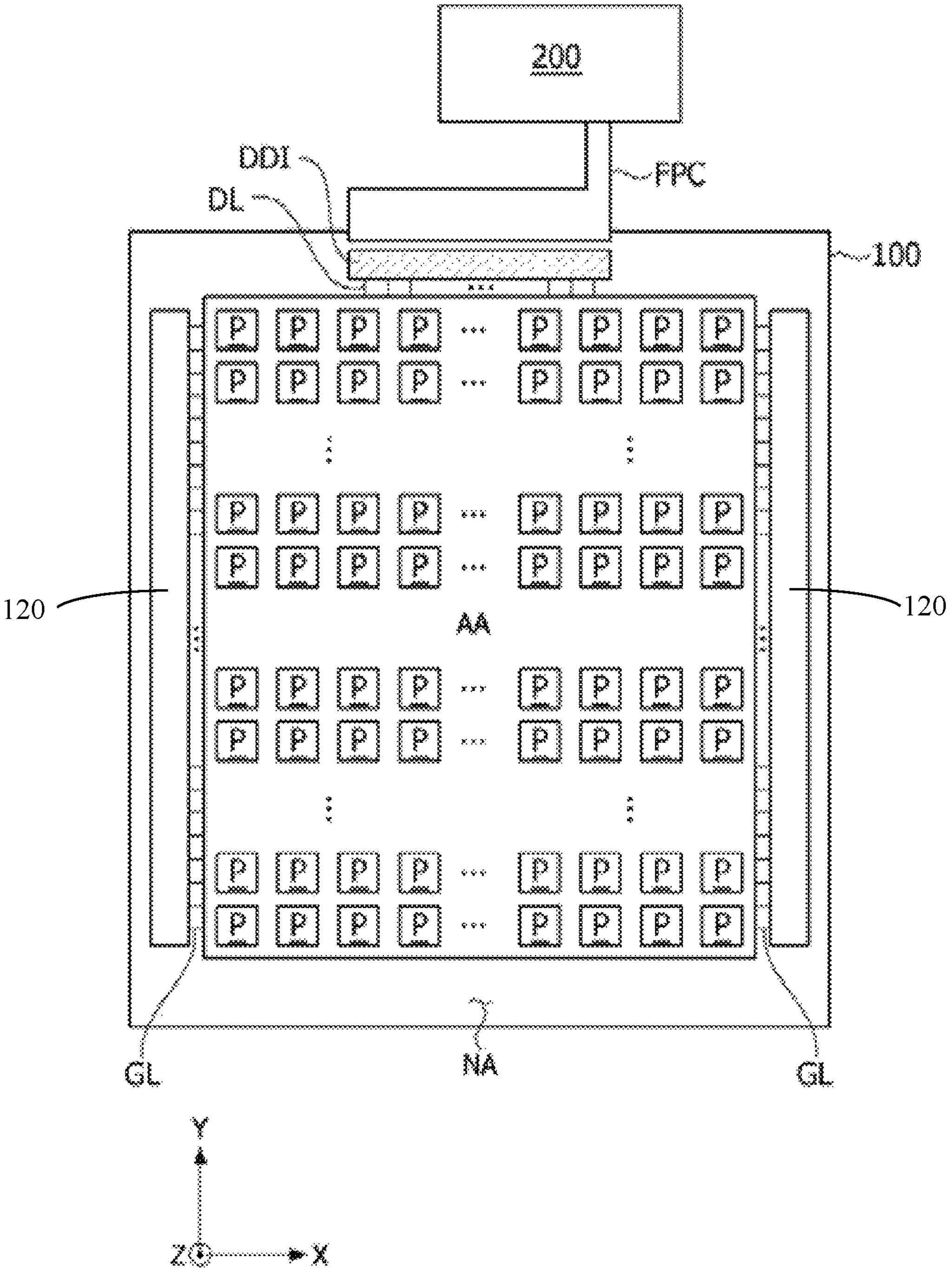
FIG. 2 is a view showing an example of a DDI connected to a display panel.

Referring to FIGS. 1 and 2, the display device according to an embodiment of the present disclosure includes a display panel 100 and a display panel driver for writing pixel data of input images to pixels of the display panel 100.

The display panel 100 may be a rectangular panel structure having a length (or width) in the X-axis direction, a length in the Y-axis direction, and a thickness in the Z-axis direction. The display panel 100 includes a display area AA that displays input images on the screen. The display area AA includes a plurality of data lines DL, a plurality of gate lines GL intersecting with the data lines DL, and pixels P arranged in a matrix form defined by the data lines DL and gate lines GL.

Each of the pixels P may be divided into red sub-pixels, green sub-pixels, and blue sub-pixels for color implementation. Each pixel may additionally include a white sub-pixel. Each sub-pixel includes a pixel circuit. The sub-pixels may include color filters, but these may be omitted. Hereinafter, a pixel may be interpreted to have the same meaning as a sub-pixel. In the case of an OLED display, the pixel circuit may include a driving transistor that drives the light-emitting element, a storage capacitor that stores the gate-source voltage of the driving transistor, and a plurality of switch transistors.

The display panel may be implemented as an LTPO (Low-Temperature Polycrystalline Oxide) panel. The LTPO panel is implemented using backplane technology that includes LTPS (Low-Temperature Polycrystalline Silicon) and IGZO (Indium Gallium Zinc Oxide) as semiconductor layers for transistors, while combining their advantages. LTPS may increase the electron mobility of TFTs (Thin Film Transistors), and IGZO may implement oxide TFTs that are advantageous for power consumption due to low leakage current. When driving an LTPO panel with Variable Refresh Rate (VRR), power consumption may be reduced without image quality degradation by dynamically adjusting the refresh rate according to the content characteristics of the input image.

Touch sensors may be arranged on the screen of the display panel 100. The touch sensors may be implemented as on-cell type or add-on type sensors arranged on the screen of the display panel, or as in-cell type touch sensors embedded in the display area AA.

The display panel driver visually reproduces the input images on the display area AA of the display panel 100 by writing pixel data of the input images to the pixels P. The display panel driver includes a data driver 110, a gate driver 120, and a timing controller 130. The display panel driver may further include a touch sensor driver. The touch sensor driver drives the touch sensors, determines touch input by comparing output signals from the touch sensors with a predetermined threshold value, and transmits coordinate data of the touch input to the host system.

The data driver 110 includes a digital circuit part that receives pixel data of input images from the timing controller 130, and an analog circuit part that generates data voltages Vdata by converting the pixel data into gamma-compensated voltage using a Digital to Analog Converter (hereinafter referred to as "DAC"). The gamma reference voltage input from the power supply 150 is input to the voltage distribution circuit of the data driver 110, and the voltage distribution circuit may generate gamma-compensated voltages for each gray level by dividing the gamma reference voltage and provide them to the DAC. The data voltages of the pixel data output from the data driver 110 are supplied to the data lines DL.

The gate driver 120 may be arranged in the non-display areas NA on both sides outside the display area AA, but is not limited thereto. Under the control of the timing controller 130, the gate driver 120 sequentially outputs gate pulses of the gate signal to the gate lines GL in units of pixel lines in the X-axis direction. The gate driver 120 may sequentially supply the gate signals to the gate lines GL by shifting the gate signals using a shift register. The pixels P of the display panel 100 is charged with the data voltages which are synchronized with the pulses of the gate signals when the gate signals are applied in pixel line units in the X-axis direction.

The timing controller 130 receives pixel data of input images and timing signals synchronized with the pixel data from the host system 200. The timing signals include a vertical sync signal Vsync, a horizontal sync signal Hsync, a data enable signal DE, etc. One period of the vertical synchronization signal Vsync corresponds to one frame period. One period of the horizontal sync signal Hsync and the data enable signal DE is one horizontal period 1H. The pulse of the data enable signal DE is synchronized with one line of data to be written to the pixels of one pixel line. Since the frame period and the horizontal period may be determined by counting the data enable signals DE, the vertical sync signal Vsync and the horizontal sync signal Hsync may be omitted.

The timing controller 130 includes a digital circuit part that is driven while a driving voltage VDDR is applied so as to receive and process pixel data of input images. The timing controller 130 may perform various pre-set image quality enhancement algorithms. The timing controller 130 or DDI may reduce power consumption of the timing controller 130 or DDI without degrading the image quality reproduced on the display panel 100 by optimizing the driving voltage VDDR output from the power supply 150 using the control signal CTR. The power supply 150 may change the voltage level of the driving voltage VDDR after a predetermined delay time when the data of the control signal CTR from the timing controller 130 or DDI is changed.

The timing controller 130 may determine the frame frequency of input images by counting pulses of the horizontal sync signal Hsync or data enable signal DE received from the host system 200. Meanwhile, in the MIPI DSI (Mobile Industry Processor Interface Display Serial Interface) protocol, the timing controller 130 or DDI may determine the frame frequency of input images through the DCS (Display Command Set) register that is changed by the AP (Application Processor) whenever the frame frequency is changed.

The host system 200 may be a main circuit board of a TV (Television) system, set-top box, navigation system, personal computer (PC), vehicle system, home theater system, mobile device, or wearable device. In mobile devices or wearable devices, as shown in FIG. 2, the timing controller 130 and data driver 110 may be integrated into a single DDI. The DDI may receive pixel data and timing signals of input images from the host system 200 and output the pixel data processed in the digital circuit part as data voltages. The data voltages output from the DDI is supplied to the data lines DL.

The DDI may further include a touch sensor driver (omitted from the drawings) and the power supply 150. The host system 200 may execute applications or process data corresponding to touch input in response to touch input coordinate data input from the touch sensor driver.

In mobile devices, the host system 200 may be implemented as an AP (Application Processor). The AP may transmit pixel data and timing signals of input image to the DDI through MIPI (Mobile Industry Processor Interface). The DDI may be directly attached to the display panel 100 in a COG (Chip on glass) process or mounted on a flexible film and attached to the display panel 100 in a COF (chip on film) form. In FIG. 2, the FPCB (flexible printed circuit board) is connected between the circuit board of the host system 200 and the display panel 100 to electrically connect the host system 200 to the DDI.

The timing controller 130 generates data timing control signals for controlling the operation timing of the data driver 110 and gate timing control signals for controlling the operation timing of the gate driver 120 based on the timing signals (Vsync, Hsync, DE) received from the host system 200.

The display panel drivers 110, 120 may be driven with Variable Refresh Rate VRR under the control of the timing controller 130. For example, the timing controller 130 may analyze the input images and reduce the refresh rate to decrease the display device's power consumption when the input images show no change for a preset time. In this case, the display panel drivers 110, 120 may reduce the power consumption of the display device by lowering the refresh rate of pixels P to extend the pixel data writing cycle when still images are input for more than a certain period of time under the control of the timing controller 130. The driving circuit of the display panel 100 may lower the refresh rate in response to the display device operating in standby mode or user commands. Also, the refresh rate may be lowered in the AOD (Always On Display) screen. The AOD screen may be either a partial pixel area of the display area AA where brief information such as the battery level and time is displayed in standby mode, or an auxiliary display area electrically connected to the display area AA.

The power supply 150 may include a charge pump, regulator, buck converter, and boost converter, etc. The power supply 150 generates constant voltage (or DC voltage) required for driving the display panel drivers 110, 120 and display panel 100 by adjusting the DC input voltage (Vin) input from the host system 200. The power supply 150 may output constant voltages such as a gamma reference voltage, high and low level voltages of gate signals, constant voltages required for driving pixels P, and IC driving voltages. The IC driving voltage may include an IC power voltage, a DDI driving voltage VDDR, etc. The driving voltage VDDR is the driving voltage applied to the digital circuit part within the timing controller 130 or DDI. The power supply 150 may be implemented as a PMIC (Power Management Integrated Circuit) but is not limited thereto.

Figure 3:
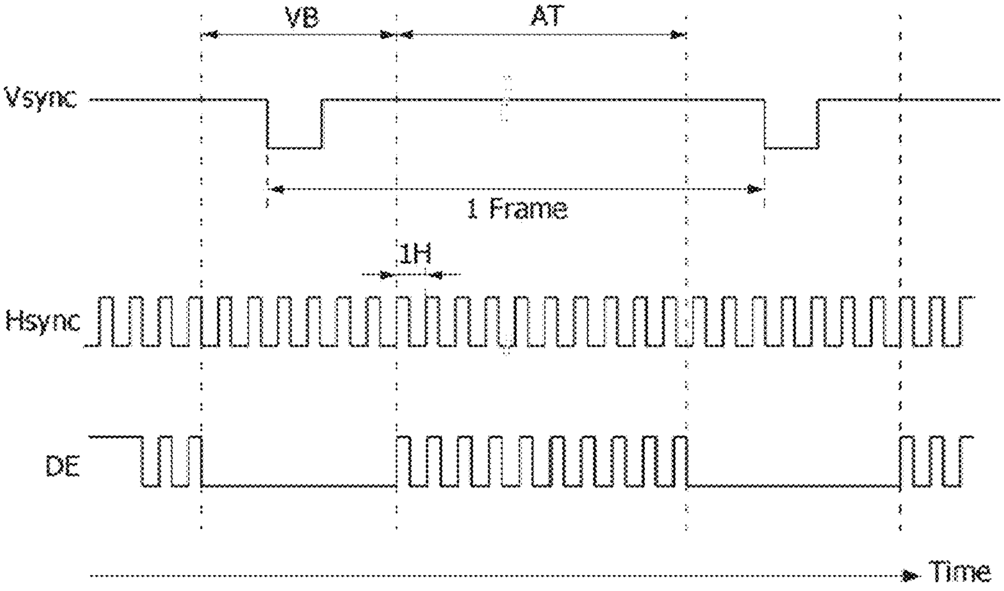
FIG. 3 is a view showing one frame period.

FIG. 3 shows one frame period. In FIG. 3, the vertical sync signal Vsync, horizontal sync signal Hsync, and data enable signal DE are timing signals synchronized with pixel data of the input image.

Referring to FIG. 3, one frame period (1 Frame) is divided into an active interval AT and a vertical blank period VB where there is no pixel data.

The pixel data of the input images is input to the timing controller 130 during the active interval AT, and the data driver 110 may output data voltages. The vertical blank period VB is a period without pixel data between the active interval AT of the (N−1)th frame period (N is a natural number) and the active interval AT of the (N)th frame period. While the data driver 110 or DDI outputs data voltages of pixel data during the active interval AT, the data driver 110 or DDI does not output data voltages during the vertical blank period VB. When the refresh rate decreases, the vertical blank period VB may be extended to become longer.

The vertical sync signal Vsync defines one frame period. One pulse period of the horizontal sync signal Hsync and data enable signal DE is one horizontal period 1H. The data enable signal DE defines valid data intervals where pixel data exists.

Figure 4:
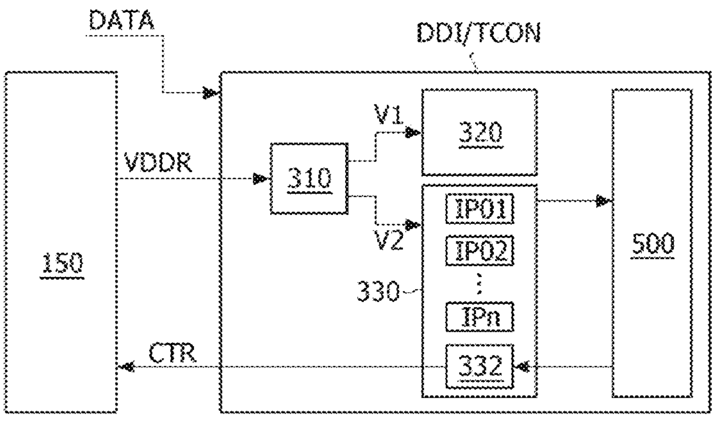
FIG. 4 is a block diagram showing an example of a DDI according to an embodiment of the present disclosure.

FIG. 4 shows a block diagram of a DDI according to an embodiment of the present disclosure. In FIG. 4, 'DDI/TCON' represents the digital circuit part of the DDI or timing controller 130.

Referring to FIG. 4, the DDI or timing controller (TCON) includes a voltage adjustment part 310, a frame memory 320, a digital circuit part 330, and a control part 500.

The control part 500 may be implemented as an MCU (Micro Control Unit) but is not limited thereto. The MCU includes a CPU (Central Processing Unit) that may independently generate and execute instructions and process data, memory, timer, counter, and communication interface. The memory may include a non-volatile memory such as ROM/Flash memory and a volatile memory such as RAM. The MCU's memory may share an existing memory embedded in the DDI or timing controller (TCON). Hereinafter, the explanation will be focused on the embodiment where the MCU is embedded in the DDI. However, the present disclosure is not limited thereto. For example, the timing controller (TCON) may include an MCU having power control authority.

The voltage adjustment part 310 receives the driving voltage VDDR from the power supply 150 and adjusts it to output constant voltages: the driving voltage for the frame memory 320 (hereinafter "first voltage") V1 and the driving voltage for the digital circuit part 330 (hereinafter "second voltage") V2. The voltage adjustment part 310 may be implemented as an LDO (Low Dropout Regulator) but is not limited thereto.

The driving voltage VDDR may be a constant voltage selected between 1-2V, for example, but is not limited thereto. The first voltage V1 and the second voltage V2 are constant voltages lower than the driving voltage VDDR. The second voltage V2 is a voltage lower than the first voltage V1.

The frame memory 320 operates by receiving the first voltage as an input. When pixel data DATA of input images is received, the frame memory 320 stores one frame of pixel data DATA and supplies the pixel data DATA to the data driver 110 according to the refresh rate of the display panel 100.

The digital circuit part 330 is driven by receiving the second voltage V2. The digital circuit part 330 may receive pixel data and timing signals of input images and determine the frame frequency or refresh rate of the input images. The digital circuit part 330 may receive frequency information of the input images and pixel luminance values from the host system 200. The digital circuit part 330 may determine the On Pixel Ratio (hereinafter 'OPR') for each frame by reading gray scale values of one frame of pixel data stored in the frame memory 320.

The digital circuit part 330 may supply one or more of the following to the control part 500: enable signals of functional modules IP01-IPn, frame frequency or refresh rate of input images, pixel luminance values, and OPR.

The pixel luminance value may be DBV (Display Brightness Value). The host system 200 may increase the DBV to raise pixel luminance of the display panel 100 when the surrounding environment is bright as detected by the luminance sensor's output signal, while decreasing the DBV to lower pixel luminance of the display panel 100 when the environment is dark. Additionally, the host system 200 may adjust the DBV value in response to user commands input through the user interface to adjust pixel luminance as desired by the user.

The OPR is the ratio of illuminated pixels in the display area AA. The OPR is used as information for calculating required power consumption in input image content or using brightness of pixels. For example, as the OPR decreases, power consumption of the display panel 100 decreases because there are fewer illuminated pixels.

The digital circuit part 330 includes one or more functional modules IP01-IPn required for operating the timing controller 130 or DDI, and a power controller 332 that supplies the voltage control signal CTR to the power supply 150 under the control of the control part 500.

The functional modules IP01-IPn may include various functional modules such as data analysis module, color conversion module, color gamut conversion module, optical compensation module, pixel degradation compensation module, image retention compensation module, and communication interface conversion module. Each of the functional modules IP01-IPn may be turned on/off by enable signals generated by the control logic of the host system 200, the timing controller 130, or the DDI. For example, as shown in FIG. 5, the first functional module IP01 may operate when the voltage of the first enable signal is at an activation level, for example, a high level (High, H), and may stop operating when disabled at a deactivation level, for example, a low level (Low, L).

The control part 500 optimizes the driving voltage VDDR according to DDI driving characteristics by adjusting the voltage level of the driving voltage VDDR in response to data input from the digital circuit part 330. As an example, the control part 500 outputs a control signal to change the voltage level of the driving voltage VDDR when one or more of the following changes: enable signals of functional modules IP01-IPn, frame frequency or refresh rate of input images, pixel luminance value, or OPR. The power controller 332 may transmit the control signal CTR received from the control part 500 to the power supply 150 through a standard interface, for example, SWIRE (Single Wire Interface), but is not limited thereto. The control signal CTR may include a start signal, digital data indicating the voltage level, and an end signal.

The power supply 150 may sample and decode digital data from the control signal CTR from the power controller 332 and store it in the built-in voltage setting register. The power supply 150 may convert the digital data stored in the voltage setting register into analog voltages by the DAC of the power supply 150. Therefore, when the data value of the control signal CTR changes and the voltage setting register is updated, the voltage level of the driving voltage VDDR output from the power supply 150 may be changed.

Figure 5:
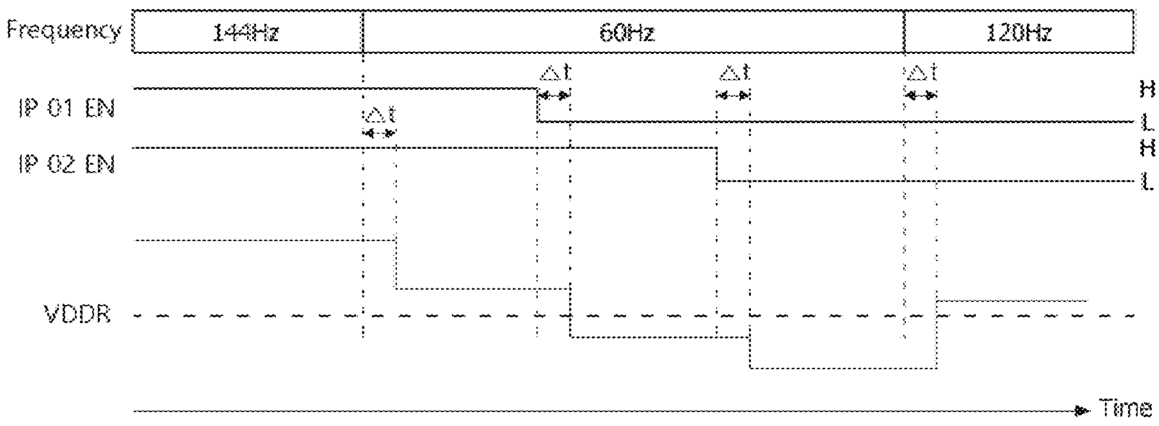
FIG. 5 is a waveform diagram showing an example of a driving voltage that varies according to frame frequency and enable signal of a functional module.

FIG. 5 shows a waveform diagram showing an example of the driving voltage that varies according to frame frequency and enable signals of functional modules. In FIG. 5, 'IP 01 EN' is the first enable signal for enabling the first functional module IP01. 'IP 02 EN' is the second enable signal for enabling the second functional module IP02. In FIG. 5, the dotted line of 'VDDR' indicates the average voltage level when the driving voltage VDDR varies.

Referring to FIG. 5, the control part 500 may monitor the frame frequency or refresh rate of input images in real-time and control the power supply 150 to change the voltage level of the driving voltage VDDR when the frame frequency or refresh rate changes. The control part 500 may control the power supply 150 to lower the voltage level of the driving voltage VDDR when the frame frequency or refresh rate of input images decreases, while increasing the voltage level of the driving voltage VDDR when the frame frequency or refresh rate of input images increases. When the frame frequency or refresh rate of input images changes, the control part 500 may control the power supply 150 to change the voltage level of the driving voltage VDDR not immediately but after a predetermined delay time Δt. This is to prevent malfunction by ensuring that necessary parameter settings are completed before the voltage level of the driving voltage VDDR is changed, as functional modules IP01-IPn change their operating states after parameter setting.

The control part 500 may control the voltage level of the driving voltage VDDR based on enable signals of the functional modules IP01-IPn. The control part 500 may control the power supply 150 to lower the voltage level of the driving voltage VDDR when the number of functional modules IP01-IPn in operation decreases by monitoring voltage levels of enable signals in real-time. Conversely, the control part 500 may control the power supply 150 to increase the voltage level of the driving voltage VDDR when the number of functional modules IP01-IPn in operation increases by monitoring voltage levels of the enable signals in real-time. When the voltage levels of enable signals are inverted, the control part 500 may control the power supply 150 to change the voltage level of the driving voltage VDDR not immediately but after a predetermined delay time Δt.

For example, when the frame frequency of input images decreases from 144 Hz to 60 Hz, the driving voltage VDDR may decrease to the first voltage level after a first delay time Δt. While the frame frequency of input images is maintained at 60 Hz, if the voltage of the first enable signal IP 01 EN is inverted from the activation level H to the deactivation level (L), the driving voltage VDDR may further decrease from the first voltage level to a second voltage level after a second delay time Δt. When the voltage of the first enable signal IP 01 EN is at the deactivation level (L), the first functional module IP01 does not operate, thus reducing the number of functional modules in operation. Subsequently, if the voltage of the second enable signal IP 02 EN is inverted from the activation level (H) to the deactivation level (L), the driving voltage VDDR may further decrease from the second voltage level to a third voltage level after a third delay time (Δt). When the second enable signal IP 02 EN is at the deactivation level (L), the second functional module IP02 does not operate. Then, when the frame frequency of input images increases from 60 Hz to 144 Hz, the driving voltage VDDR may increase from the third voltage level to a fourth voltage level after a fourth delay time Δt.

Figure 6:
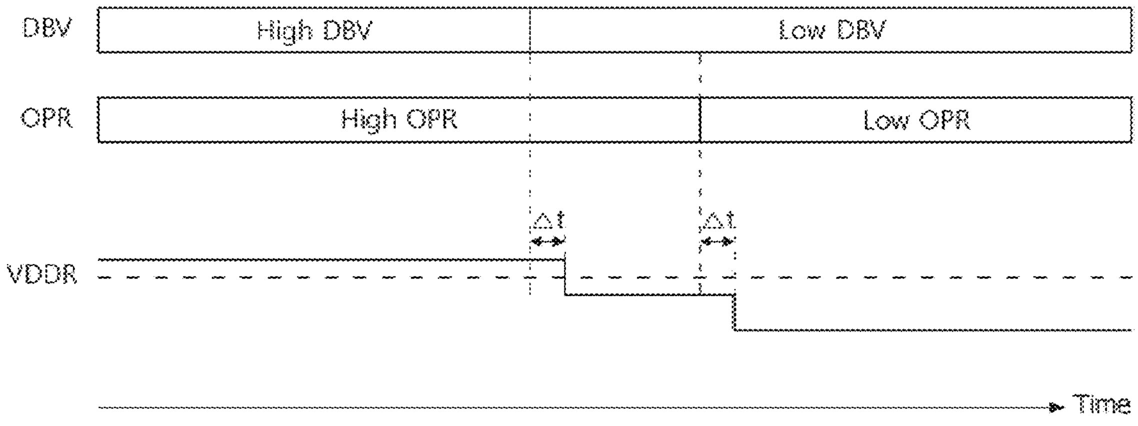
FIG. 6 is a waveform diagram showing an example of a driving voltage that varies according to DBV and OPR.

FIG. 6 shows a waveform diagram showing an example of the driving voltage that varies according to DBV and OPR. In FIG. 6, the dotted line of 'VDDR' indicates the average voltage level when the driving voltage VDDR varies.

Referring to FIG. 6, the control part 500 may control the power supply 150 to lower the voltage level of the driving voltage VDDR when DBV decreases by monitoring DBV values in real-time. Conversely, the control part 500 may control the power supply 150 to increase the voltage level of the driving voltage VDDR when DBV increases. When DBV changes, the control part 500 may control the power supply 150 to change the voltage level of the driving voltage VDDR not immediately but after a predetermined delay time Δt.

The control part 500 may control the power supply 150 to lower the voltage level of the driving voltage VDDR when OPR value decreases by monitoring OPR values in real-time. Conversely, the control part 500 may control the power supply 150 to increase the voltage level of the driving voltage VDDR when OPR value increases. When OPR value changes, the control part 500 may control the power supply 150 to change the voltage level of the driving voltage VDDR not immediately but after a predetermined delay time Δt.

For example, when both DBV and OPR are high, the driving voltage VDDR maintains a relatively high voltage, and when DBV decreases, the voltage level of the driving voltage VDDR decreases, and if the OPR value also decreases afterward, it may decrease further.

Figure 7:
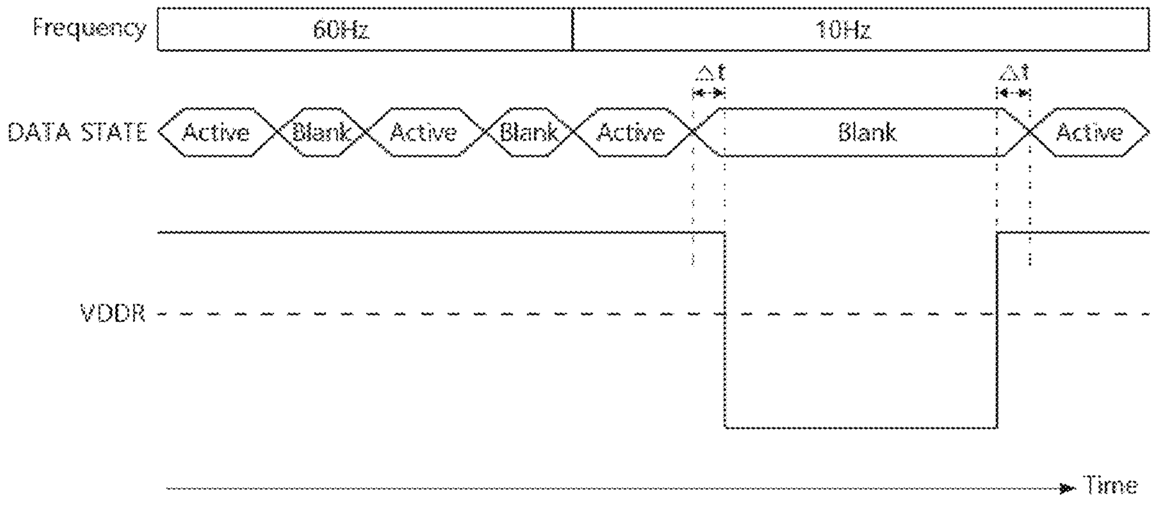
FIG. 7 is a view showing an example of a driving voltage that varies according to the presence or absence of data.

FIG. 7 shows an example of the driving voltage that varies according to the presence or absence of data. In FIG. 7, 'Active' is the active interval shown in FIG. 3, and 'Blank' is the vertical blank period shown in FIG. 3. The blank period Blank may be extended when the frame frequency or refresh rate of input images decreases. In FIG. 7, the dotted line of 'VDDR' indicates the average voltage level when the driving voltage VDDR varies. "STATE" is the data state that distinguishes the presence of valid data in input images.

Referring to FIG. 7, the control part 500 may monitor the frame frequency or refresh rate of input images in real-time and control the power supply 150 to lower the voltage level of the driving voltage VDDR during the extended vertical blank period Blank when the frame frequency or refresh rate decreases.

For example, while the frame frequency of input images is maintained at 60 Hz, the driving voltage VDDR maintains its voltage level at a relatively high constant voltage. Subsequently, when the refresh rate of the display panel 100 decreases and the frame frequency drops to 10 Hz, the driving voltage VDDR may decrease after a delay time Δt after entering the vertical blank period Blank following the end of the active interval Active. During the low refresh rate period when the frame frequency is maintained at 10 Hz, the driving voltage VDDR may increase before the extended vertical blank period Blank ends. At this time, the driving voltage VDDR may increase ahead by the delay time Δt before entering the active interval Active.

The objects to be achieved by the present disclosure, the means for achieving the objects, and effects of the present disclosure described above do not specify essential features of the claims, and thus, the scope of the claims is not limited to the disclosure of the present disclosure.

Although the exemplary embodiments of the present disclosure have been described in more detail with reference to the accompanying drawings, the present disclosure is not limited thereto and may be embodied in many different forms without departing from the technical concept of the present disclosure. Therefore, the exemplary embodiments disclosed in the present disclosure are provided for illustrative purposes only and are not intended to limit the technical concept of the present disclosure. The scope of the technical concept of the present disclosure is not limited thereto. Therefore, it should be understood that the above-described exemplary embodiments are illustrative in all aspects and do not limit the present disclosure.

What is claimed is:

1. A display driver comprising:

a voltage adjustment part configured to receive a driving voltage from a power supply and to output a first voltage and a second voltage;

a frame memory configured to receive the first voltage and to store pixel data of input images;

a digital circuit part configured to be driven by receiving the second voltage, the digital circuit part including a memory, a plurality of functional blocks, and a power controller; and a control part configured to generate a control signal for controlling the driving voltage in response to a signal input from the digital circuit part.

2. The display driver according to claim 1, wherein the control part includes an MCU (Micro Control Unit).

3. The display driver according to claim 1, wherein the voltage adjustment part includes an LDO (Low Dropout Regulator).

4. The display driver according to claim 3, wherein:

the first voltage and the second voltage are lower than the driving voltage, and the second voltage is lower than the first voltage.

5. The display driver according to claim 1, wherein the control part is configured to generate the control signal in response to one or more of: an enable signal of each of the functional blocks, frame frequency or refresh rate of the input images, DBV (Display Brightness Value), and on pixel ratio (OPR).

6. The display driver according to claim 5, wherein:

the power controller is configured to transmit the control signal to the power supply through SWIRE (Single Wire Interface), and the power supply is configured to change a voltage level of the driving voltage after a predetermined delay time in response to the control signal.

7. The display driver according to claim 5, wherein the driving voltage decreases after a first delay time when the frame frequency or refresh rate of the input images decreases, and increases after a second delay time when the frame frequency or refresh rate of the input images increases.

8. The display driver according to claim 5, wherein while monitoring each enable signal of functional blocks in real-time, the driving voltage decreases when a number of the functional blocks in operation decreases and increases when the number of functional blocks in operation increases.

9. The display driver according to claim 5, wherein:

when the frame frequency of the input images decreases from a first frequency to a second frequency, the driving voltage decreases to a first voltage level after a first delay time, while the frame frequency of the input images is maintained at the second frequency, when a voltage of a first enable signal is inverted from an activation level to a deactivation level, the driving voltage decreases from the first voltage level to a second voltage level after a second delay time, while the frame frequency of the input images is maintained at the second frequency and the voltage of the first enable signal is maintained at the deactivation level, when a voltage of a second enable signal is inverted from the activation level to the deactivation level, the driving voltage decreases from the second voltage level to a third voltage level after a third delay time, and while the frame frequency of the input images is maintained at the second frequency and the voltages of both the first enable signal and the second enable signal are maintained at the deactivation level, when the frame frequency of the input images increases from the second frequency to the first frequency, the driving voltage increases from the third voltage level to a fourth voltage level after a fourth delay time.

10. The display driver according to claim 5, wherein the voltage level of the driving voltage decreases when the DBV decreases, and the voltage level of the driving voltage increases when the DBV increases.

11. The display driver according to claim 5, wherein the voltage level of the driving voltage decreases when the on pixel ratio decreases, and the voltage level of the driving voltage increases when the on pixel ratio increases.

12. The display driver according to claim 5, wherein when either one of the DBV and the on pixel ratio decreases, the voltage level of the driving voltage decreases to a first voltage level, and when both the DBV and the on pixel ratio decrease, the voltage level of the driving voltage decreases to a second voltage level that is lower than the first voltage level.

13. The display driver according to claim 5, wherein:
when the frame frequency of the input images decreases, the vertical blank period is extended, and
when entering the extended vertical blank period, the voltage level of the driving voltage decreases, and before entering the active interval from the extended vertical blank period, the voltage level of the driving voltage increases.

14. A display device comprising:
a display panel including a plurality of data lines, a plurality of gate lines intersecting with the data lines, and a plurality of pixels arranged for displaying input images;
a data driver configured to convert received pixel data into data voltages and to supply the data voltages to the data lines;
a timing controller configured to receive pixel data and timing signals of the input images and transmits the pixel data to the data driver; and
a power supply configured to output a driving voltage,
wherein the timing controller includes:
a voltage adjustment part configured to receive the driving voltage and to output a first voltage and a second voltage;
a frame memory configured to receive the first voltage and stores pixel data of the input images;
a digital circuit part configured to be driven by receiving the second voltage, the digital circuit part including a memory, a plurality of functional blocks, and a power controller; and
a control part configured to generate a control signal for controlling the driving voltage in response to a signal input from the digital circuit part.

15. The display device according to claim 14, wherein:
the control part includes an MCU (Micro Control Unit), and
the voltage adjustment part includes an LDO (Low Dropout Regulator).

16. The display device according to claim 15, wherein:
the control part is configured to generate the control signal in response to one or more of: an enable signal of each of the functional blocks, frequency or refresh rate of the input images, DBV (Display Brightness Value), and on pixel ratio (On Pixel Ratio),
the power controller is configured to transmit the control signal to the power supply through SWIRE (Single Wire Interface), and
the power supply is configured to change the voltage level of the driving voltage after a predetermined delay time in response to the control signal.

17. A display device comprising:
a display panel including a plurality of data lines, a plurality of gate lines intersecting with the data lines, and a plurality of pixels arranged for displaying input images;
a display driver IC (Integrated Circuit) configured to receive pixel data and timing signals of the input images and to convert the pixel data into data voltages to supply the data voltages to the data lines; and
a PMIC (Power Management Integrated Circuit) configured to output a driving voltage,
wherein the display driver IC includes:
an LDO (Low Dropout Regulator) configured to receive the driving voltage and to output a first voltage and a second voltage;
a frame memory configured to receive the first voltage and to store pixel data of the input images;
a digital circuit part is configured to be driven by receiving the second voltage, the digital circuit part including a memory, a plurality of functional blocks, and a power controller; and
an MCU (Micro Control Unit) configured to generate a control signal for controlling the driving voltage in response to a signal input from the digital circuit part.

18. The display device according to claim 15, wherein:
the MCU is configured to generate the control signal in response to one or more of: enable signals of each of the functional blocks, frequency or refresh rate of the input images, DBV (Display Brightness Value), and on pixel ratio (On Pixel Ratio),
the power controller is configured to transmit the control signal to the power supply through SWIRE (Single Wire Interface), and
the PMIC is configured to change the voltage level of the driving voltage after a predetermined delay time in response to the control signal.

19. The display device according to claim 18, wherein:
the driving voltage decreases after a first delay time when the frame frequency or refresh rate of the input images decreases, and increases after a second delay time when the frame frequency or refresh rate of the input images increases, and
the driving voltage decreases when the number of functional blocks in operation decreases and increases when the number of functional blocks in operation increases, while monitoring each enable signal of the functional blocks in real-time.

20. The display device according to claim 19, wherein:
the voltage level of the driving voltage decreases when the DBV decreases, and the voltage level of the driving voltage decreases when the DBV increases,
the voltage level of the driving voltage decreases when the on pixel ratio decreases, and the voltage level of the driving voltage increases when the on pixel ratio increases, and
during a low refresh rate period when the frame frequency of the input images has decreased, when entering the extended vertical blank period, the voltage level of the driving voltage decreases, and before entering the active interval from the extended vertical blank period, the voltage level of the driving voltage increases.

* * * * *